(12) United States Patent
Yang et al.

(10) Patent No.: US 6,373,545 B1
(45) Date of Patent: Apr. 16, 2002

(54) REPAIRABLE TFT-LCD ASSEMBLY AND METHOD FOR MAKING IN WHICH A SEPARATION TAPE POSITIONED BETWEEN TWO ANISOTROPIC CONDUCTIVE FILMS

(75) Inventors: Chin Chen Yang; Fang I. Shieh; Hong-Yu Lin, all of Hsin chu; Yu Chi Lee, Tao-Yuan; Chi Yuan Wu; Su Yu Fun, both of Hsinchu, all of (TW)

(73) Assignee: Industrial Technology Research Institute, Hsin Chu (TW)

( * ) Notice: Subject to any disclaimer, the term of this patent is extended or adjusted under 35 U.S.C. 154(b) by 0 days.

(21) Appl. No.: 09/274,587

(22) Filed: Mar. 23, 1999

(30) Foreign Application Priority Data

Nov. 3, 1998 (TW) .......................................... 87118401

(51) Int. Cl.$^7$ ............................................ G02F 1/1345
(52) U.S. Cl. ........................................ 349/149; 349/152
(58) Field of Search ................................ 349/149, 151, 349/152, 192; 438/30

(56) References Cited

U.S. PATENT DOCUMENTS 5,822,030 A * 10/1998 Uchiyama .................... 349/149
6,031,590 A * 2/2000 Kim .............................. 349/86
6,104,464 A * 8/2000 Adachi et al. ............... 349/150
6,111,628 A * 8/2000 Shiota qt el. ................ 349/150
6,172,878 B1 * 1/2001 Takabayashi et al. ....... 361/760

* cited by examiner

Primary Examiner—William L. Sikes
Assistant Examiner—Mike Qi
(74) Attorney, Agent, or Firm—Tung & Associates

(57) ABSTRACT

A repairable TFT-LCD assembly and a method for fabricating such assembly have been disclosed. In the repairable TFT-LCD assembly, a novel separation tape is utilized between the TFT and the LCD substrate such that when the tape is pulled in a perpendicular direction to the planar surface of the LCD substrate, the TFT can be separated from the assembly without causing damages to the LCD substrate. The separation tape is fabricated of a polymeric based insulating material with a multiplicity of apertures filled with a conductive metal. The back of the separation tape is laminated with a copper film which is patterned corresponding to the pattern of conductive pads provided on the LCD substrate. The present invention is further directed to a method for fabricating the separation tape for use in a repairable TFT-LCD assembly.

20 Claims, 4 Drawing Sheets

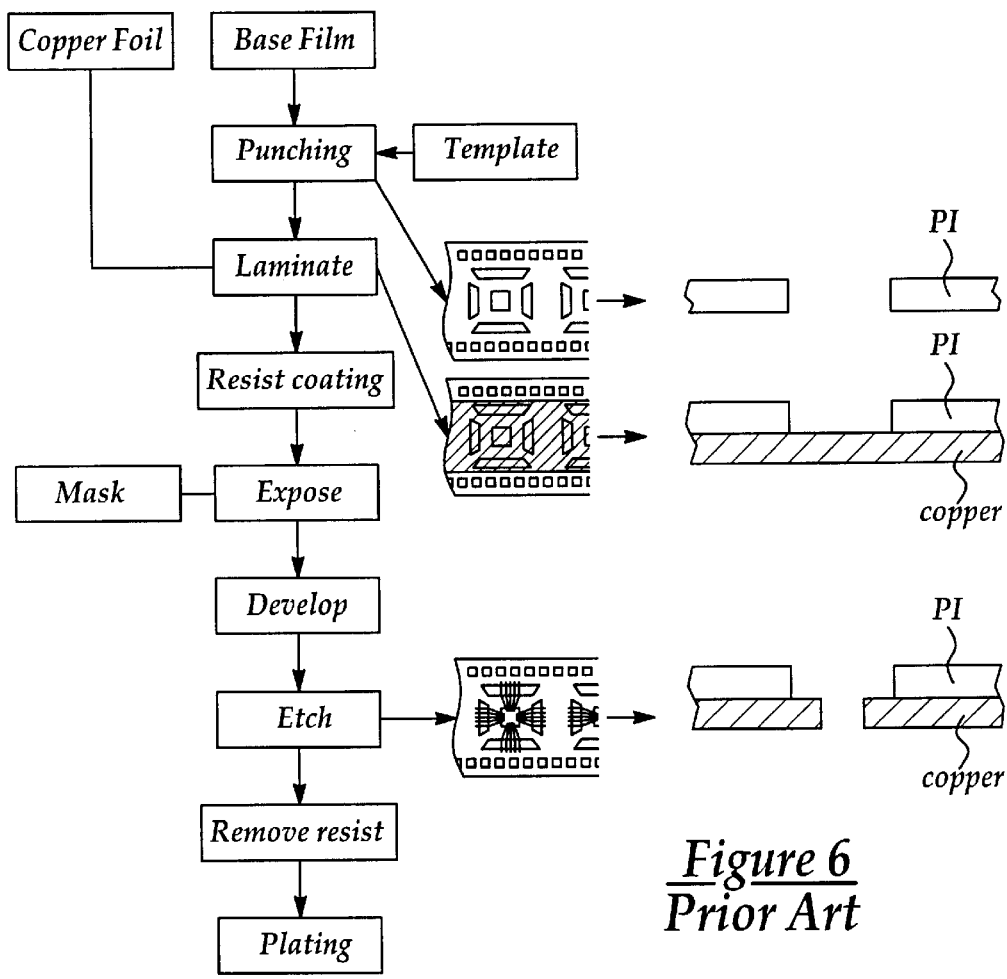
*Figure 6*
*Prior Art*
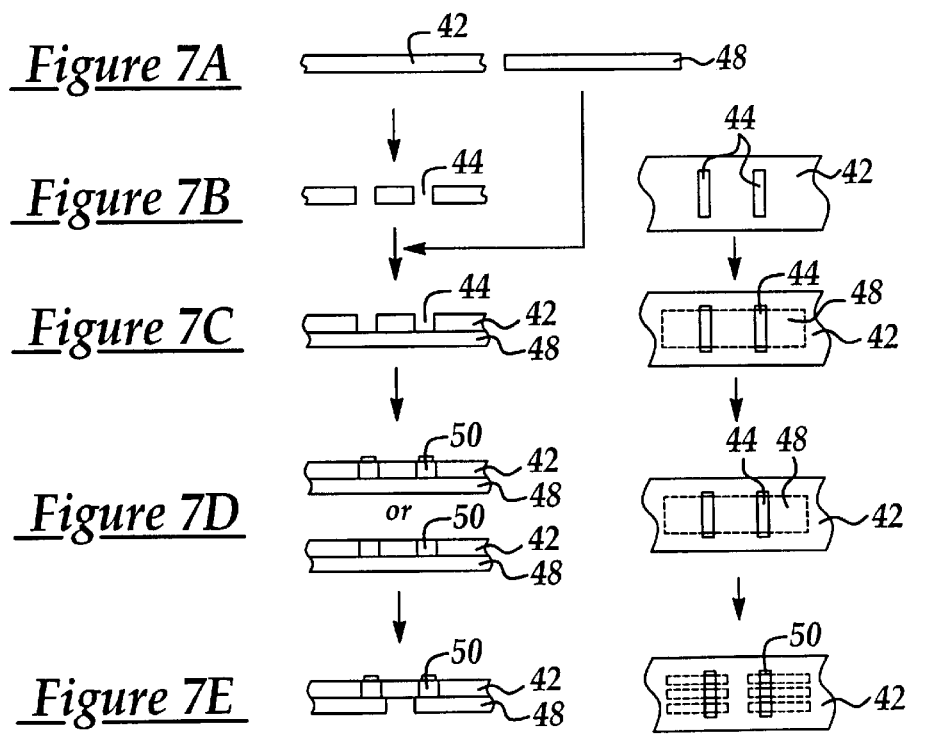

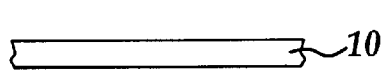
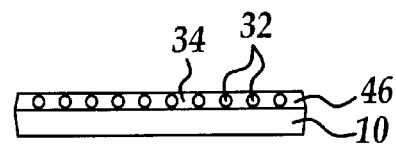
*Figure 8A*  *Figure 8B*
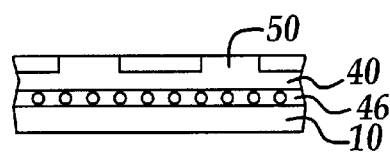
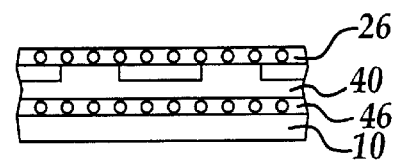
*Figure 8C*  *Figure 8D*
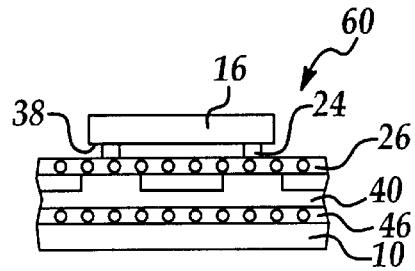
*Figure 8E*
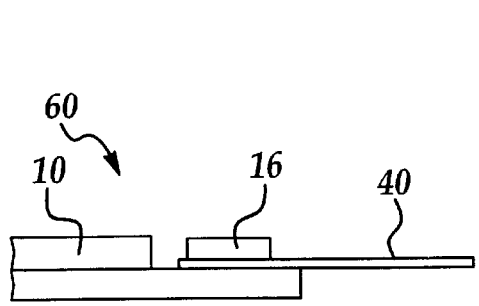
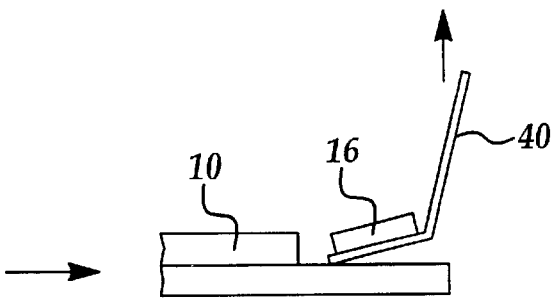
*Figure 9A*  *Figure 9B*

REPAIRABLE TFT-LCD ASSEMBLY AND METHOD FOR MAKING IN WHICH A SEPARATION TAPE POSITIONED BETWEEN TWO ANISOTROPIC CONDUCTIVE FILMS

FIELD OF THE INVENTION

The present invention generally relates to a TFT-LCD assembly and method for making the assembly and more particularly, relates to a TFT-LCD assembly that incorporates the use of a separation tape such that a TFT may be separated from the assembly if found defective and method for making such assembly.

BACKGROUND OF THE INVENTION

In recent years, liquid crystal display (LCD) panels have been used widely in place of cathode ray tubes (CRT) in electronic display applications. The LCD panel is first assembled together by filling a liquid crystal material inbetween a LCD substrate and a transparent glass cover plate. The LCD substrate consists of a multiplicity of switching, or electronic turn-on and turn-off devices for operating the multiplicity of pixels formed on the LCD panel.

After the assembly of a LCD panel is completed, the panel must be connected to an outside circuit for receiving electronic signals such that images may be produced in the panel. The electronic connections to the LCD panel can be provided by different techniques. A conventional technique for providing electronic signals to a LCD panel is by using a flexible printed circuit board (FPCB) which contains various electronic components welded thereto for providing signals to the LCD. The flexible printed circuit board is frequently manufactured of a conductive copper layer sandwiched between two flexible polyimide cover layers. The flexibility of FPCB is advantageous in the installation of a LCD panel. FIG. 1A is a graph illustrating a conventional design of LCD panel 10 connected by a FPCB 12 to a printed circuit board (PCB) 14 which has a surface mount technology (SMT) type IC chip 16 mounted on top.

In another conventional technique for bonding a LCD to a PCB, as shown in FIG. 1B, a tape automated bonding (TAB) technique is used. In the TAB bonding technique, a TAB section 20 is used to connect LCD 10 and PCB 14. The TAB section 20 consists of a TAB tape 22 which has an IC chip 16 connected to it through bonding sites 24. The TAB bonding technique provides the benefit of a compact package so that circuit density can be improved resulting in a lead pitch as low as 50 μm. The TAB, also known as TCP (tape carrier package) utilizes finely patterned thin metal, i.e., copper foil plated with Au or Sn, in place of wires and connects the metal tips metallurgically to corresponding gold plated bumps that are formed on the aluminum pads on the chip. TAB is preferred in smaller-pitch interconnects for high I/O ULSI devices because it enables smaller pitch and longer span bondings than those available by wire bonding. However, the TAB bonding technique is normally conducted at a higher fabrication cost.

In still another technique for bonding a LCD to a PCB, as shown in FIG. 1C, a chip on glass (COG) technique is used. In the COG technique, an IC chip 16 is mounted directly on a LCD 10 by utilizing solder bumps 24 and an anisotropic conductive film (ACF) 26. Detailed cross-sectional views of an ACF 26 is shown in FIGS. 2A and 2B. As shown in FIG. 2A, a TAB tape 22 which has conductive pads 28 formed on top is positioned over an ACF tape 30 which contains electrically conductive particles 32 embedded an insulative compound 34. Positioned under the ACF 30 is a LCD substrate 10 which has conductive elements 36 formed on top. After the TAB tape 22, the ACF 30 and the LCD substrate 10 are pressed together under heat, as shown in FIG. 2B, the conductive particles 32 provides electrical communication between the conductive pads 28 and the conductive elements 36 and therefore allowing the TAB tape 22 to electrically communicate with the LCD substrate 10. It should be noted that, electrical communication between the conductive pads 28 and the conductive elements 26 is only established where the conductive particles 32 are compressed, i.e., only established anisotropically and selectively. The conductive elements 36 on the LCD substrate 10 is normally formed of indium-tin-oxide (ITO) thin films.

As shown in FIG. 1C, the COG technique may further connect the LCD substrate 10 to a printed circuit board (not shown) by a flexible printed circuit board (not shown). The COG technique therefore relies on bonding with solder bumps 24 formed on an IC chip and the ACF for electrical communications.

As seen in the three conventional techniques for forming a TFT-LCD assembly, each of the techniques has its benefits and disadvantages. For instance, in the first technique of using SMT/FPCB, the circuit density can be increased to achieve a compact package at the expense of using difficult TAB technology and high material costs. In the TAB and COG method, a rework of the assembly such as the removal of a defective IC from a LCD substrate is extremely difficult, if not impossible. For instance, the only possible means for removing an IC chip that is bonded to a LCD substrate is by using a shear force for pushing an IC chip and breaking its bond with the LCD substrate. This is a difficult process and frequently results in the destruction of the entire assembly.

In the present fabrication process for TFT-LCD assemblies, the SMT/FPCB method is frequently used in fabricating lower priced assemblies such as those utilizing small LCD panels. In large LCD panel applications, i.e., such as those used in notebook computers, the TAB bonding method is normally used. The COG method, due to its difficulty in reworking and repair, is also limited to small LCD panel display applications. The TAB process and the COG process are therefore the two major assembling methods used for TFT-LCD assemblies. To sum up, the TAB method can be easily reworked and repaired by removing an IC chip with the TAB tape from the LCD substrate and furthermore, it is compact in size which allows the achievement of high density packages of up to 50 μm pitch. However, the TAB process requires complicated fabrication steps which include IC bonding, tape fabrication, inner lead bonding, encapsulation, outer lead bonding, the ACF process and the soldering process. Another drawback for the TAB process is, during the ACF processing, there is a thermal expansion problem which may lead to misalignment between the leads. The TAB tape may further absorb moisture and contribute to its dimensional instability. Elaborate equipment may also be required for the TAB process and therefore increasing its fabrication costs.

In the COG process, while the fabrication steps are simpler, i.e., only IC bumping and ACF processes, and further, there is no thermal expansion problem and smaller pitch such as 50 μm can be achieved, the rework of an IC chip from a LCD substrate is extremely difficult since the IC chip is bonded to the substrate in its entire surface area. The COG process is therefore not suitable for large LCD panel applications for fear of scrapping the high cost LCD panel.

It is therefore an object of the present invention to provide a repairable TFT-LCD assembly that does not have the drawbacks and shortcomings of the conventional TFT-LCD assemblies.

It is another object of the present invention to provide a TFT-LCD assembly that can be easily reworked or repaired when a defective IC chip is found.

It is a further object of the present invention to provide a repairable TFT-LCD assembly by incorporating the use of a separation tape.

It is another further object of the present invention to provide a repairable TFT-LCD assembly by bonding a IC chip to a LCD substrate by utilizing two anisotropic conductive films and a separation film.

It is still another object of the present invention to provide a repairable TFT-LCD assembly by utilizing a separation tape of an insulating material having a multiplicity of apertures therethrough filled with a conductive metal.

It is yet another object of the present invention to provide a method for fabricating a repairable TFT-LCD assembly by compressing, under heat) an IC chip, a first ACF film, a separation film, a second ACF film and a LCD substrate together.

It is still another further object of the present invention to provide a method for fabricating a separation tape for use in a repairable TFT-LCD assembly by first providing an insulating tape having a multiplicity of apertures therethrough and then filling the cavities with a conductive metal such as copper by an electroless plating technique or a solder paste screen printing technique.

It is yet another further object of the present invention to provide a method for reworking a repairable TFT-LCD assembly by utilizing a high tensile strength separation tape between the IC chip and the LCD such that the tape may be pulled up for separating a defective IC chip from a LCD substrate.

SUMMARY OF THE INVENTION

In accordance with the present invention, a repairable TFT-LCD assembly and a method for fabricating such an assembly are provided.

In a preferred embodiment, a method for fabricating a repairable TFT-LCD assembly can be carried out by the operating steps of providing a LCD substrate equipped with conductive pads on a top surface, bonding a first anisotropic conductive film (ACF) to the top surface of the LCD substrate, positioning a separation tape on top of the first ACF, the separation tape is made of an electrically insulating material and provided with a multiplicity of apertures at locations corresponding to the conductive pads on the LCD substrate, each of the multiplicity of apertures is filled with a conductive metal, bonding a second ACF to a top surface of the separation tape, positioning an IC chip on top of the second ACF and aligning a multiplicity of bond pads on the IC chip to the conductive pads on the LCD substrate, and pressing the IC chip, the second ACF, the separation tape, the first ACF and the LCD substrate together under heat for a length of time sufficient to establish electrical communication between the IC chip and the LCD substrate through the conductive pads and the bond pads.

The method for fabricating a repairable TFT-LCD assembly may further include the step of forming the first and second ACF by an insulating material filled with conductive particles. The method may further include the steps for forming the separation tape by providing a polymeric based film, forming a multiplicity of apertures in the film at locations corresponding to the conductive pads on the LCD substrate, laminating a conductive metal film to the polymeric based film, filling the multiplicity of apertures with a conductive metal, and patterning the conductive metal film to the multiplicity of bond pads on the IC chip.

The polymeric base film used for the separation tape may be a polyimide film. The conductive metal film laminated to the polymeric based film may be a copper film. In the method, the multiplicity of apertures may be filled with a conductive metal by a method of evaporation, electroplating, electroless plating or screen printing. The multiplicity of apertures may be filled with copper. The separation tape may be sandwiched between the first ACF and the second ACF layers. The separation tape may have sufficient tensile strength such that, when pulled in a direction perpendicular to a plane of the LCD substrate, separates the IC chip from the LCD substrate.

The present invention is further directed to a method for fabricating a separation tape for use in a repairable TFT-LCD assembly by the steps of first providing a polymeric based film, forming a first multiplicity of apertures in the film at locations corresponding to a first multiplicity of conductive pads on a LCD substrate, laminating a conductive metal film to the polymeric based film, filling the first multiplicity of apertures with a conductive metal, and patterning the conductive metal film to a second multiplicity of bond pads on an IC chip which is to be assembled with the LCD substrate.

In the method, the polymeric based film may have a tensile strength of at least 20 Kg/mm$^2$ and a dielectric constant of at least 2.5. The polymeric based film may be a polyimide film, while the conductive metal film may be a copper film. The method may further include the step of filling the first multiplicity of apertures with a conductive metal by a method such as evaporation, electroplating, electroless plating or solder paste screen printing. The first multiplicity of apertures may be filled with copper.

The present invention is still further directed to a repairable TFT-LCD assembly which includes a LCD substrate equipped with conductive pads on a top surface, a first anisotropic conductive film (ACF) overlying the LCD substrate, a separation film overlying the first ACF and is formed of an insulating material with a multiplicity of apertures therethrough corresponding to the positions of the conductive pads on the LCD substrate, a conductive metal filling the multiplicity of apertures, a second ACF overlying the separation film, and an IC chip positioned on top of the second ACF which has a multiplicity of bond pads connected to the conductive pads on the LCD substrate through electrically conductive particles in the first and second ACF and through the conductive metal in the multiplicity of apertures in the separation film.

In the repairable TFT-LCD assembly, the separation film may be a polymeric based film which has a tensile strength of at least 20 Kg/mm$^2$. The separation film may also be a polymeric film which has a dielectric constant of at least 2.5. The conductive metal filling the multiplicity of apertures may be copper.

BRIEF DESCRIPTION OF THE DRAWINGS

These and other objects, features and advantages of the present invention will become apparent from the following detailed description and the appended drawings in which:

FIG. 6 is a process flow chart for fabricating a TCP tape and the corresponding cross-sections obtained at different stages of the fabrication process.

FIG. 7 is a graph illustrating enlarged, cross-sectional views and plane views of the present invention separation tape during various stages of the fabrication process.

FIG. 8 is a graph of enlarged, cross-sectional views of a present invention TFT-LCD assembly during various fabrication stages.

FIG. 9 are cross-sectional views showing a repair procedure for the present invention TFT-LCD assembly.

DETAILED DESCRIPTION OF THE PREFERRED EMBODIMENT

The present invention discloses a repairable TFT-LCD assembly and a method for forming such assembly. The novel TFT-LCD assembly incorporates the use of a separation tape such that the assembly can be reworked or repaired when a defective IC chip is discovered. The IC chip can be separated from the assembly by the separation tape without causing any damage to the LCD substrate. While the present invention TFT-LCD assembly can be used in any applications, it is more particularly suitable for use in large-size LCD applications so that a defective IC chip does not cause the scrap of the assembly.

The separation tape utilized in the present invention novel TFT-LCD assembly may be fabricated by first providing a polymeric based film such as a polyimide, then forming a multiplicity of apertures in the film at locations corresponding to the conductive pads on a LCD substrate, then laminating a conductive metal film such as a copper foil to the polymeric based film, then filling the multiplicity of apertures with a conductive metal such as copper, and patterning the conductive metal film to the multiplicity of bond pads on the IC chip. The multiplicity of apertures may be filled with the conductive metal by a variety of techniques including evaporation, electroplating, electroless plating and solder paste screen printing.

The present invention repairable TFT-LCD assembly may be fabricated by first providing a LCD substrate that is equipped with conductive pads on a top surface, the conductive pads may be formed of an ITO material, then bonding a first anisotropic conductive film (ACF) to the top surface of the LCD substrate, then positioning a separation tape on top of the first ACF, the separation tape may be made of an electrically insulating material and provided with a multiplicity of apertures at locations corresponding to the conductive pads on the LCD substrate, each of the multiplicity of apertures may be filled with a conductive metal, then bonding a second ACF to a top surface of the separation tape, then positioning an IC chip on top of the second ACF and aligning a multiplicity of bond pads such as solder bumps on the IC chip to the conductive pads on the LCD substrate, and then pressing the IC chip, the second ACF, the separation tape, the first ACF and the LCD substrate together under sufficient heat for a sufficient length of time to establish electrical communication between the IC chip and the LCD substrate through the conductive pads and the bond pads.

Figure 1A:
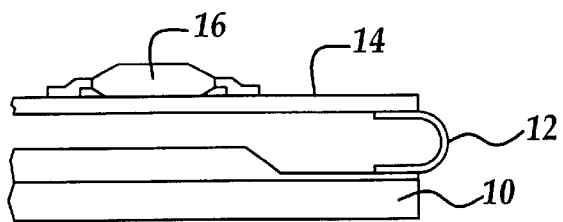
FIG. 1A is a graph illustrating a conventional SMT type IC bonded on a printed circuit board and connected to a LCD substrate by a flexible printed circuit board.
Figure 1B:
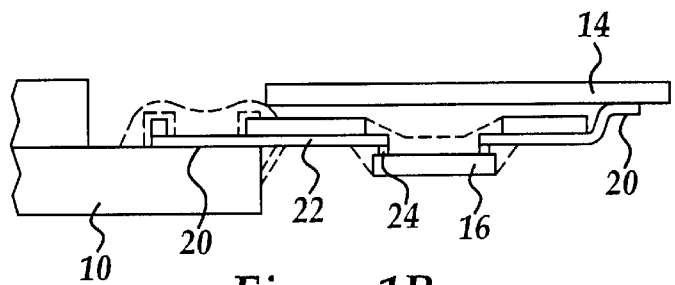
FIG. 1B is a graph illustrating a conventional method of using a TAB tape for connecting a LCD substrate to a PCB.
Figure 1C:
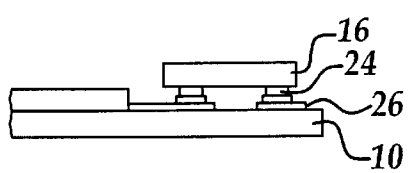
FIG. 1C is a graph illustrating a conventional chip on glass technique for collecting an IC chip to a LCD substrate.
Figure 2A:
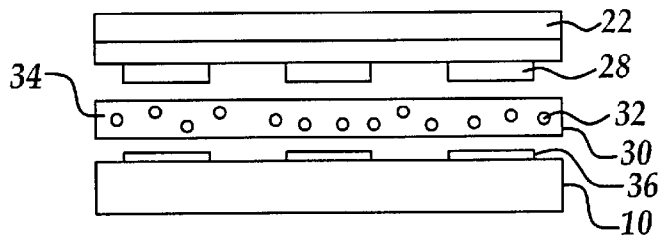
FIG. 2A is a graph illustrating a method for bonding a TAB tape to a LCD substrate by an anisotropic conductive film.
Figure 2B:
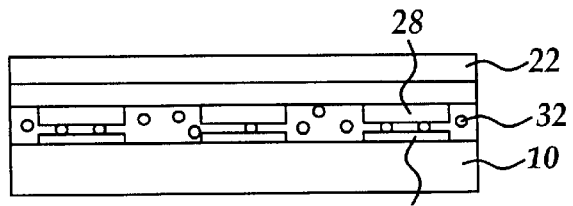
FIG. 2B is a graph illustrating the components of FIG. 2A after pressed together under heat and electrical communication between the TAB tape and the LCD substrate is established.
Figure 3:
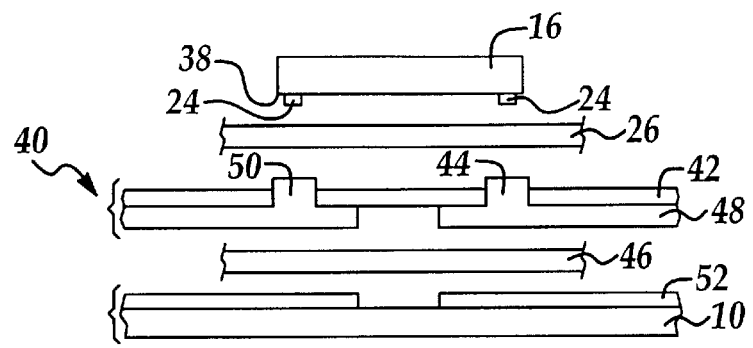
FIG. 3 is an enlarged, cross-sectional view of a present invention assembly of repairable TFT-LCD utilizing a separation tape.

Referring now to FIG. 3 which shows an enlarged, cross-sectional view of the present invention novel TFT-LCD in its components. An IC chip 16 which has solder bumps 24 formed on an active surface 38 is first provided. A first ACF 26 and a second ACF 46 are then provided with a separation tape 40 sandwiched thereinbetween. The separation tape 40 is constructed by an electrically insulating tape 42 that is provided with a multiplicity of apertures 44. The electrically insulating tape 42 may be suitably selected from a polyimide material which has a suitable tensile strength of not smaller than 25 Kg/mm$^2$, and a suitable dielectric constant of not less than 2.5. The tensile strength requirement is necessary such that the film is strong enough for separating an IC chip from a LCD substrate when pulled without causing excessive deformation or breakage in the film. The dielectric constant requirement is necessary such that suitable electrical insulating property is built into the film. A copper film 48 is laminated to the bottom side of the polymeric film 42 while a conductive metal 50 is used to fill the multiplicity of cavities 44 in the polymeric film 42. A detailed process description for forming the separation tape 40 is provided in a later section. Also shown in FIG. 3 is a LCD substrate 10 which contains an active circuit 52 on top.

Figure 4:
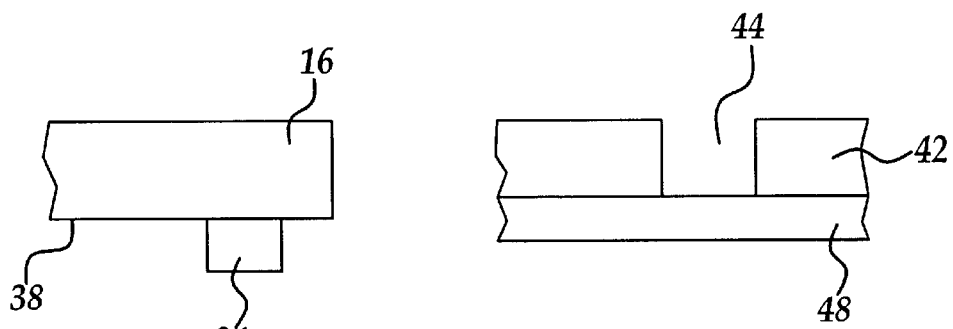
FIG. 4 are enlarged, cross-sectional views of an IC chip having solder bumps formed thereon and a separation tape having a copper foil laminated thereto.

A detailed construction method and property requirements are described as follows. FIG. 4 shows enlarged, cross-sectional views of the IC chip 16 and the polymeric tape 42. In a typical fabrication process for IC chips, the solder bumps 24 formed on the active surface 38 may have a typical height of between about 20 $\mu$m and about 25 $\mu$m. The height of the solder bumps 24 is therefore significantly smaller than the thickness of a suitable polymeric film 42, i.e., in the range between about 50 $\mu$m and about 75 $\mu$m. The larger thickness of the polymeric film layer 42 is necessary in order to maintain its suitable tensile strength for pulling away from a LCD substrate. The thickness difference, as shown in FIG. 4, indicates that the IC chip 16 cannot be bonded directly to the metal foil 48 laminated to the polymeric film 42 since electrical communication cannot be established. The filling of the multiplicity of apertures 44 with a conductive metal therefore becomes necessary for establishing electrical communication between the IC chip 16 and the LCD substrate 10. The process of filling the multiplicity of apertures 44 with a conductive metal is explained in detail in FIG. 7.

Figure 5:
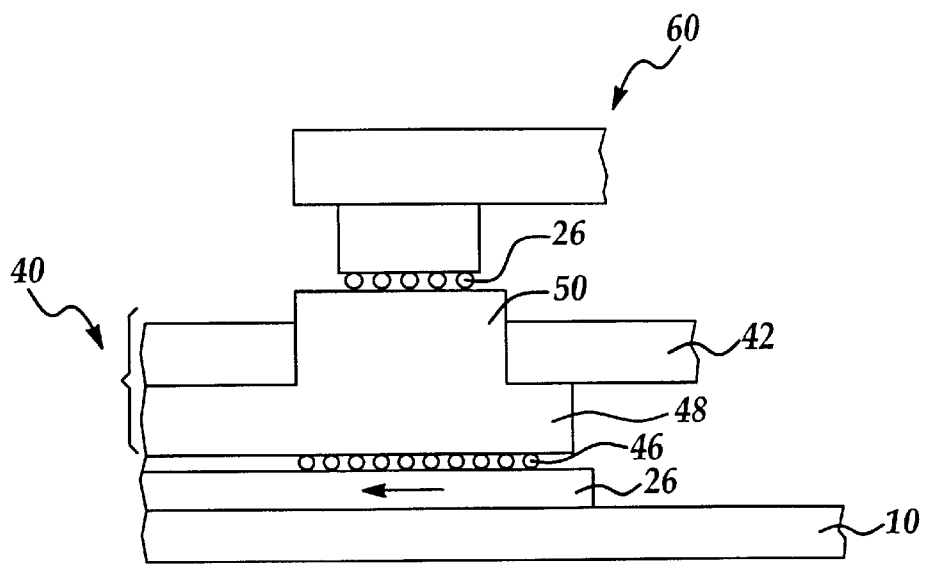
FIG. 5 is an enlarged, cross-sectional view of an IC chip bonded to a LCD substrate by the present invention separation tape.

An enlarged, cross-sectional view of the present invention novel TFT-LCD assembly and specifically, the method for establishing electrical communications between the two major components of TFT and LCD is exemplified in FIG. 5. As shown in FIG. 5, the IC chip 16 establishes electrical communication with the LCD substrate 10 and its conductive pads 26 through the use of two ACF layers and the present invention novel separation tape 40. The arrow indicated by "i" shows the electrical conductance path established through the TFT-LCD assembly 60.

Before the fabrication steps of the present invention novel separation tape 40 are illustrated, it is beneficial to examine a typical process flow chart for fabricating a conventional TAB or TCP tape. This is shown in FIG. 6. In the conventional process for making a TCP tape, a base film is first supplied and then punched by a template to form cavities for both transporting and for providing cavities for an IC die. The punched base film is then laminated with a copper foil in a center portion overlapping the IC cavities and the mounting sites for finger leads. A standard photolithography process is then conducted to form the necessary pattern in the copper foil by an etching process. The photoresist layer is then removed after the copper foil is patterned and an electroplating process is utilized to fill the cavities in the TCP tape.

The fabrication process for the present invention novel separation tape is shown in FIG. 7. In step A, an insulating polymeric film layer, such as a polyimide layer 42 together with a copper foil 48 are first provided. The polyimide film layer 42 is then punched to form a multiplicity of apertures 44 in the film. This is shown in step B. The copper foil layer 48 is then laminated to the bottom surface of the polyimide film 42, as shown in step C. In the next step of the process, i.e., step D, a variety of techniques may be used to fill the multiplicity of apertures 44 with a conductive metal 50. It should be noted that, as shown in FIG. 7D, the top surface of the conductive metal 50 may be planarized after the completion of the deposition process. A standard photolithography process is then performed on the copper film 48 to form the necessary pattern for connecting to a LCD substrate in a subsequent process.

After the present invention novel separation tape 40 is fabricated by the steps shown in FIG. 7, the separation tape 40 can be utilized in the present invention novel structure of TFT-LCD assembly 60 in a process shown in FIG. 8. In the process, a LCD substrate 10 is first provided. On top of the LCD substrate 10, there are conductive pads (not shown) for establishing electrical communications with an IC chip. A first ACF layer 46 is then positioned on top of the LCD substrate 10. The ACF layer 46 consists of conductive particles 32 embedded in an insulating polymeric material 34. The present invention separation tape 40 is then positioned on top of the ACF layer 46. The multiplicity of apertures filled with a conductive metal 50 is aligned with the conductive pads (not shown) on top of the LCD substrate 10. In the next step of the process, a second ACF layer 26 is positioned on top of the separation film 40. In the final step, an IC chip 16 equipped with solder bumps 24 on an active surface 38 is positioned on top of the second ACF layer 26. The solder bumps 24 are aligned with the metal conductors 50 and the conductive pads (not shown) on the LCD substrate 10 such that when the assembly 60 is pressed under heat, electrical communication is established between the IC chip 16 and the LCD substrate 10. It should be noted that the copper foil 48 on the separation tape 40 is patterned to accomplish such electrical communication.

A rework or repair process utilizing the present invention novel TFT-LCD assembly 60 is illustrated in FIGS. 9A and 9B. It is seen that when the separation tape 40 is pulled in a perpendicular direction to the plane of the LCD substrate 10, the IC chip 16 is separated from the top surface of the LCD substrate 10. The separation tape is formed with a polymeric material which has a minimum required tensile strength of about 20 Kg/mm$^2$ such that an effective separation can be accomplished without excessive elongation or breakage of the film.

The present invention novel TFT-LCD assembly and its method for fabricating such assembly have therefore been amply demonstrated in the above descriptions and in the appended drawings of FIGS. 3~5 and 7~9.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

What is claimed is:

1. A method for fabricating a repairable TFT-LCD assembly comprising the steps of:
   providing a LCD substrate equipped with conductive pads on a top surface,
   bonding a first anisotropic conductive film (ACF) to the top surface of said LCD substrate,
   positioning a separation tape on top of said first ACF, said separation tape being formed of an electrically insulating material and provided with a multiplicity of apertures at locations corresponding to said conductive pads on said LCD substrate, each of said multiplicity of apertures is filled with a conductive metal,
   bonding a second ACF to a top surface of said separation tape,
   positioning an IC chip on top of said second ACF and aligning a multiplicity of bond pads on said IC chip to said conductive pads on said LCD substrate, and
   pressing said IC chip, said second ACF, said separation tape, said first ACF and said LCD substrate together under heat for a length of time sufficient to establish electrical communications between said IC chip and said LCD substrate through the conductive pads and the bond pads.

2. A method for fabricating a repairable TFT-LCD assembly according to claim 1 further comprising the step of forming said first and second ACF by an insulating material filled with conductive particles.

3. A method for fabricating a repairable TFT-LCD assembly according to claim 1 further comprising the steps for forming said separation tape by:
   providing a polymeric based film,
   forming a multiplicity of apertures in said film at locations corresponding to said conductive pads on said LCD substrate,
   laminating a conductive metal film to said polymeric based film,
   filling said multiplicity of apertures with a conductive metal, and
   patterning said conductive metal film to said multiplicity of bond pads on said IC chip.

4. A method for fabricating a repairable TFT-LCD assembly according to claim 3, wherein said polymeric based film is a polyimide film.

5. A method for fabricating a repairable TFT-LCD assembly according to claim 3, wherein said conductive metal film is a copper film.

6. A method for fabricating a repairable TFT-LCD assembly according to claim 1, wherein said multiplicity of apertures are filled with a conductive metal by a method selected from the group consisting of evaporation, electroplating, electroless plating and screen printing.

7. A method for fabricating a repairable TFT-LCD assembly according to claim 1, wherein said multiplicity of apertures are filled with a conductive metal by solder paste screen printing.

8. A method for fabricating a repairable TFT-LCD assembly according to claim 1, wherein said multiplicity of apertures are filled with copper.

9. A method for fabricating a repairable TFT-LCD assembly according to claim 1, wherein said separation tape is sandwiched between said first ACF and said second ACF layers.

10. A method for fabricating a repairable TFT-LCD assembly according to claim 1, wherein said separation tape has sufficient tensile strength such that, when pulled in a direction perpendicular to a plane of said LCD substrate, it separates said IC chip from said LCD substrate.

11. A method for fabricating a separation tape for use in a repairable TFT-LCD assembly comprising the steps of:

providing a polymeric based film, forming a first multiplicity of apertures in said film at locations correspond to a first multiplicity of conductive pads on a LCD substrate, laminating a conductive metal film to said polymeric based film, filling said first multiplicity of apertures with a conductive metal, and patterning said conductive metal film to a second multiplicity of bond pads on an IC chip to be assembled with said LCD substrate.

12. A method for fabricating a separation tape for use in a repairable TFT-LCD assembly according to claim 11, wherein said polymeric based film has a tensile strength of at least 20 Kg/mm$^2$ and a dielectric constant of at least 2.5.

13. A method for fabricating a separation tape for use in a repairable TFT-LCD assembly according to claim 11, wherein said polymeric based film is a polyimide film.

14. A method for fabricating a separation tape for use in a repairable TFT1-LCD assembly according to claim 11, wherein said conductive metal film is a copper film.

15. A method for fabricating a separation tape for use in a repairable TFT-LCD assembly according to claim 11 further comprising the step of filling said first multiplicity of apertures with a conductive metal by a method selected from the group consisting of evaporation, electroplating, electroless plating and solder paste screen printing.

16. A method for fabricating a separation tape for use in a repairable TFT-LCD assembly according to claim 11, wherein said first multiplicity of apertures are filled with copper.

17. A repairable TFT-LCD assembly comprising:

a LCD substrate equipped with conductive pads on a top surface, a first anisotropic conductive film (ACF) overlying said LCD substrate, a separation film overlying said first ACF and being formed of an insulating material with a multiplicity of apertures therein corresponding to the positions of said conductive pads on said LCD substrate, a conductive metal filling said multiplicity of apertures, a second ACF overlying said separation film, and an IC chip positioned on top of said second ACF having a multiplicity of bond pads connected to said conductive pads on said LCD substrate through electrically conductive particles in said first and second ACF and through said conductive metal in said multiplicity of apertures in said separation film.

18. A repairable TFT-LCD assembly according to claim 17, wherein said separation film is a polymeric based film having a tensile strength of at least 20 Kg/mm$^2$.

19. A repairable TFT-LCD assembly according to claim 17, wherein said separation film is a polyimide film having a dielectric constant of at least 2.5.

20. A repairable TFT-LCD assembly according to claim 17, wherein said conductive metal filling said multiplicity of apertures is copper.

* * * * *